United States Patent
Liao

(10) Patent No.: US 9,538,497 B2
(45) Date of Patent: Jan. 3, 2017

(54) METHOD OF HANDLING LOCATION REPORTING PROCEDURE AND RELATED COMMUNICATION DEVICE

(71) Applicant: HTC Corporation, Taoyuan (TW)

(72) Inventor: Ching-Yu Liao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/687,926

(22) Filed: Apr. 16, 2015

(65) Prior Publication Data

US 2015/0304982 A1    Oct. 22, 2015

Related U.S. Application Data

(60) Provisional application No. 61/980,060, filed on Apr. 16, 2014.

(51) Int. Cl.
| | | |
|---|---|---|
| *H04W 64/00* | (2009.01) | |
| *H04W 4/02* | (2009.01) | |
| *H04W 60/04* | (2009.01) | |
| *H04W 4/00* | (2009.01) | |
| *H04W 84/12* | (2009.01) | |

(52) U.S. Cl.
CPC ............ *H04W 64/00* (2013.01); *H04W 4/005* (2013.01); *H04W 4/02* (2013.01); *H04W 60/04* (2013.01); *H04W 4/023* (2013.01); *H04W 84/12* (2013.01)

(58) Field of Classification Search
CPC ........ H04W 4/005; H04W 4/02; H04W 4/023; H04W 4/20; H04W 60/04; H04W 64/00; H04W 84/12
USPC ........................................... 455/456.1–456.5
See application file for complete search history.

(56) References Cited

U.S. PATENT DOCUMENTS

2014/0342735 A1* 11/2014 Liao ................ H04W 8/04
                                                    455/435.1
2016/0157056 A1*  6/2016 Kim ................ H04W 4/023
                                                    455/414.1

OTHER PUBLICATIONS

3GPP TS 23.303 V12.0.0 (Feb. 2014) Technical Specification 3rd Generation Partnership Project; Technical Specification Group Services and System Aspects; Proximity-based services (ProSe); Stage 2 (Release 12).

European Search report issued on Dec. 9, 2015 for EP application No. 15163861.6.

HTC, "Clarification on Proximity Request and Cancellation Procedures", SA WG2 Meeting #101bis, S2-140592 (revision of 52-14XXXX), Feb. 17-21, 2014, San Jose Del Cabo, Mexico, XP050770153, pp. 1-3.

(Continued)

*Primary Examiner* — Charles Shedrick
(74) *Attorney, Agent, or Firm* — Winston Hsu; Scott Margo

(57) ABSTRACT

A method of handling a location reporting procedure comprises performing, by a first proximity service (ProSe) function entity, a registration procedure for a proximity service with a first communication device; and performing, by the first ProSe function entity, the location reporting procedure for the proximity service between the first communication device and a second communication device; and transmitting, by the first ProSe function entity, a cancel location reporting message to a Secure User Plane Location (SUPL) Location Platform (SLP) server to cancel the location reporting procedure for the first communication device registered to the first ProSe function entity, when a timer of the proximity request message expires.

23 Claims, 7 Drawing Sheets

(56) References Cited

OTHER PUBLICATIONS

Intel, "Protocol options for EPC-level Discovery", 3GPP TSG CT WG1 Meeting #86bis, C1-141221, Mar. 31-Apr. 4, 2014, Dubrovnik, Croatia, XP050775757, pp. 1-5.
Intel, Sony, CATT, III, TeleCommunication Systems, Broadcom Corporation, ITRI, Acer, NEC, MediaTek, ETRI, KPN, LG Electronics, InterDigital Communications, HTC, "EPC-level discovery and EPC support for WLAN direct communication", SA WG2 Meetig #100, S2-134537 (revision of S2-134414), Nov. 11-15, 2013, San Francisco, CA, USA, XP050765054, pp. 1-12.

* cited by examiner

METHOD OF HANDLING LOCATION REPORTING PROCEDURE AND RELATED COMMUNICATION DEVICE

CROSS REFERENCE TO RELATED APPLICATIONS

This application claims the benefit of U.S. Provisional Application No. 61/980,060, filed on Apr. 16, 2014 and incorporated herein by reference.

BACKGROUND OF THE INVENTION

1. Field of the Invention

The present invention relates to a method used in a wireless communication system and related communication device, and more particularly, to a method of handling a location reporting procedure and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Device-to-device (D2D) communication may be realized, after an initialization (e.g., connection establishment and/or peer discovery) is performed (e.g., assisted by an eNB). Then, two UEs may communicate (e.g., transmitting and/or receiving packets) with each other directly according to the D2D communication, and the eNB does not need to forward the packets transmitted between the communication devices. According to the D2D communication, the UEs may communicate with each other via UL resources (e.g., UL subframes configured by the eNB). In general, the D2D communication may also be seen as a D2D service (i.e., proximity service (ProSe)). In addition, a D2D subframe, D2D transmission, D2D communication and D2D discovery can be termed as a sidelink subframe, sidelink transmission, sidelink communication and sidelink discovery, respectively.

A UE needs to perform a discovery procedure (e.g., evolved packet core (EPC)-level ProSe discovery) which includes a location reporting procedure to perform the proximity service. In certain situations, the location reporting procedure does not need to be completed, e.g., when UEs are unlikely to enter proximity within a time window, and unnecessary overhead is transmitted between network entities if the location reporting procedure is not cancelled. According to the 3GPP standard, the location reporting procedure can only be cancelled by the UE, and flexibility and efficiency of the operation of the D2D communication is thus limited. For example, the UE may not know when the location reporting procedure should be cancelled, or the UE is unable to cancel the location reporting procedure. In addition, a timer included in a proximity request message is used for indicating a time period during which the proximity request message is valid. However, it is not clear how the EPC network can process an expired proximity request message, when the timer expires.

Furthermore, it is unknown how an EPC network can handle an EPC assisted WLAN direct communication, if one of the UEs involving in a ProSe discovery procedure detaches from the EPC network or a timer of the ProSe discovery procedure expires.

Thus, a method for solving the above problems is needed.

SUMMARY OF THE INVENTION

The present invention therefore provides a method and related communication device for handling a location reporting procedure to solve the abovementioned problem.

A method of handling a location reporting procedure comprises performing, by a first proximity service (ProSe) function entity, a registration procedure for a proximity service with a first communication device; and performing, by the first ProSe function entity, the location reporting procedure for the proximity service between the first communication device and a second communication device; and transmitting, by the first ProSe function entity, a cancel location reporting message to a Secure User Plane Location (SUPL) Location Platform (SLP) server to cancel the location reporting procedure for the first communication device registered to the first ProSe function entity, when a timer of the proximity request message expires.

A method of handling a location reporting procedure comprises performing, by a first ProSe function entity, a registration procedure for a proximity service with a first communication device; performing, by the first ProSe function entity, the location reporting procedure for the proximity service with between the first communication device and a second communication device; and transmitting, by the first ProSe function entity, a cancel location reporting message with an identity of the first communication device to a Secure User Plane Location (SUPL) Location Platform (SLP) server to cancel the location reporting procedure for the first communication device registered to the first ProSe function entity, when the first communication device is in a detached state.

A method of handling a location reporting procedure comprises performing, by a first ProSe function entity, a registration procedure for a proximity service with a first communication device; performing, by a second ProSe function entity, the registration procedure for the proximity service with a second communication device which enables an EPC assisted WLAN direct communication with the first communication device; detecting, by the first ProSe function entity, that the first communication device is in a detached state after detaching from an EPC network or that a timer of a proximity request message expires; transmitting, by the first ProSe function entity, a message to the second ProSe function entity; and performing, by the second ProSe function entity, a revocation procedure for the EPC assisted WLAN direct communication with the second communication device attached to the EPC network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
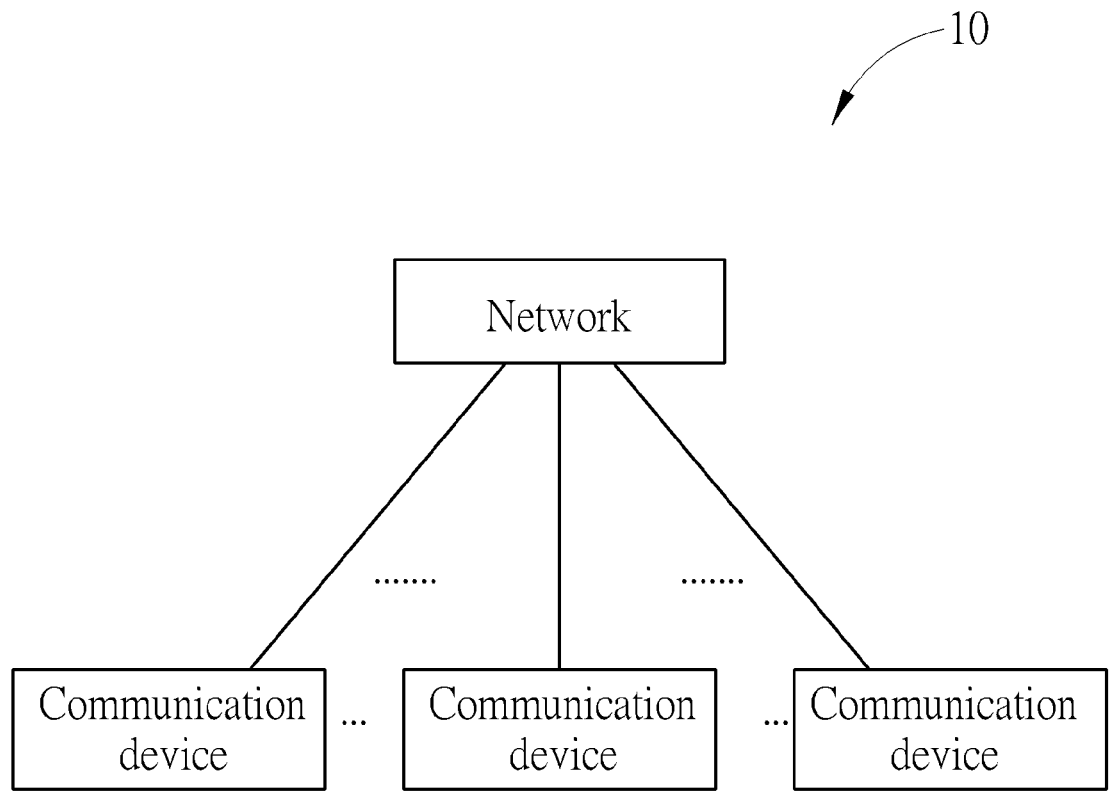
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. A communication device may communicate with the network according to a device-to-cellular (D2C) communication defined in a communication standard, e.g., the 3rd Generation Partnership Project (3GPP) standard. Practically, the network can be a universal terrestrial radio access network (UTRAN) comprising a plurality of Node-Bs (NBs) in a universal mobile telecommunications system (UMTS). In another example, the network can be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network can also include both the UTRAN/E-UTRAN and a core network (e.g., evolved packet core (EPC) network), wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information can be processed by both the UTRAN/E-UTRAN and the core network, and the decisions are made after coordination and/or cooperation are performed by the UTRAN/E-UTRAN and the core network.

A communication device can be a user equipment (UE), a low cost device (e.g., machine type communication (MTC) device), a device-to-device (D2D) device, a mobile phone, a laptop, a tablet computer, an electronic book, a portable computer system, or combination thereof. In addition, for the D2C communication, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

In addition, two communication devices may communicate with each other directly, after an initialization (e.g., connection establishment and/or peer discovery) is performed. For example, the initialization may be assisted by the network. That is, the communication devices may communicate (e.g., transmit and/or receive packets) with each other according to a D2D communication defined in a communication standard, e.g., the 3GPP standard. The communication devices may communicate with each other via UL subframes determined according to frequency-division duplexing (FDD) configuration and/or time-division duplexing (TDD) configurations. The communication device may communicate with another communication device and the network simultaneously, i.e., both the D2D communication and the D2C communication are realized at the same time.

Figure 2:
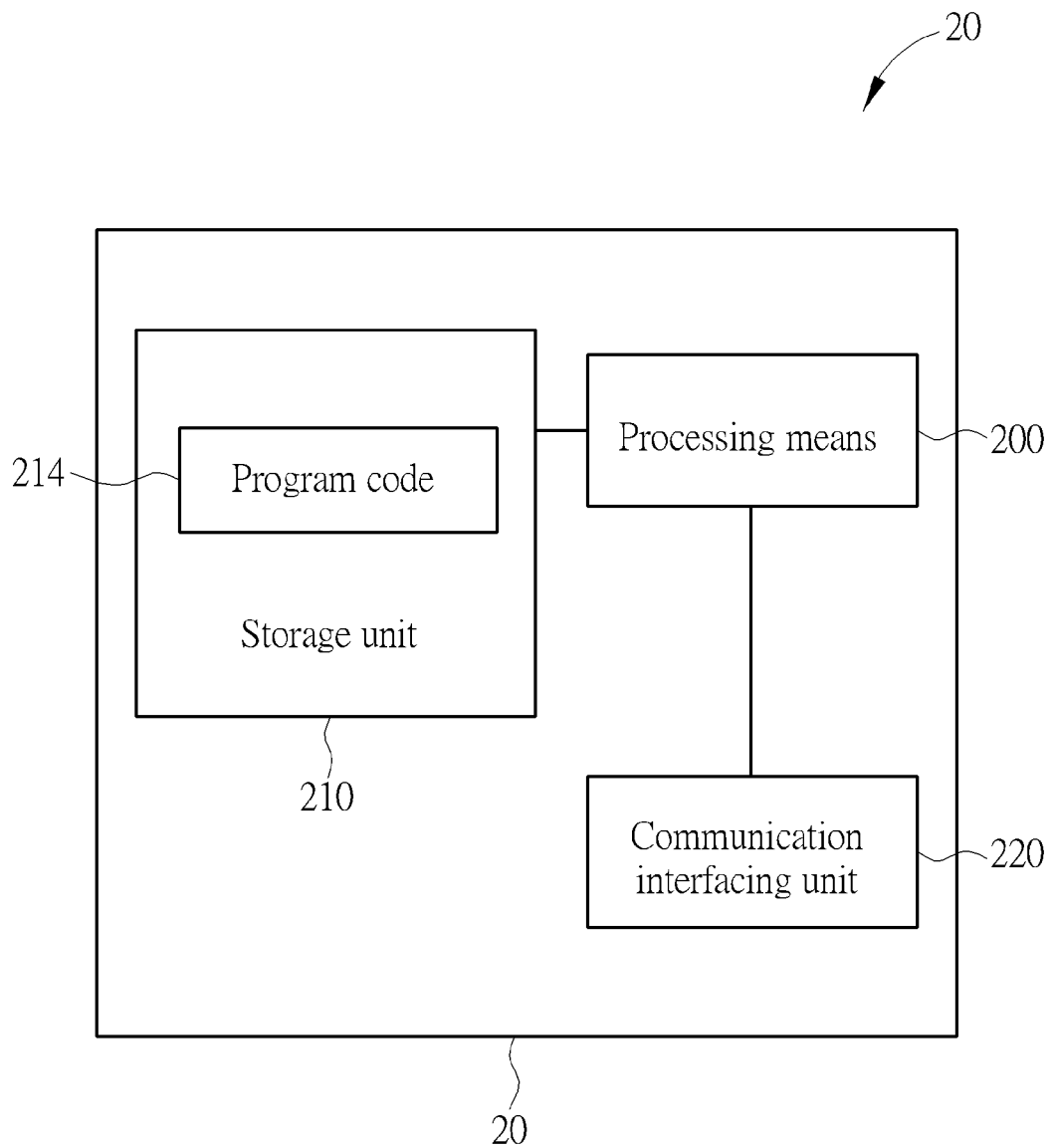
FIG. 2 is a schematic diagram of a communication device according to an example of the present invention.

FIG. 2 is a schematic diagram of a wireless terminal 20 according to an example of the present invention. The wireless terminal 20 may be a communication device or the network shown in FIG. 1, but is not limited herein. The wireless terminal 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

A registration procedure for a proximity service is illustrated as follows. A communication device may need to register with a proximity service (ProSe) function entity (i.e., ProSe function) to obtain a proximity service. For example, the communication device may register with the ProSe function entity by sending a UE registration request message. Then, the ProSe function entity may interact with a Home Subscriber Server (HSS) to authenticate the communication device and to check whether the communication device is authorized for the proximity service. Alternatively, settings related to the authentication and authorization for the proximity service may be configured locally in the ProSe function entity, in which case the interaction with the HSS is not needed. Then, the ProSe function entity may respond to the communication device by sending a UE registration response message according to the result of the authentication and authorization.

A location reporting procedure for the proximity service is illustrated as follows. The location reporting procedure may be triggered by a ProSe function entity toward an associated server running a Secure User Plane Location (SUPL) Location Platform (SLP). Then, the SLP server may configure a communication device running with a SLP client to report its location periodically, based on a trigger, or a combination of both depending on what the corresponding ProSe function entity requested. The location of the communication device may be reported by the SLP server to its corresponding ProSe function entity intermittently. Assuming that a first ProSe function entity is in charge of determining proximity, a second ProSe function entity may forward its communication device's location to the first ProSe function entity periodically, based on a trigger criterion, or a combination of both as requested by the first ProSe function entity.

A proximity request cancellation procedure for the proximity service is illustrated as follows. A communication device may decide to cancel a proximity request it sent earlier (e.g., due to location change, application termination or certain event completion). The communication device may send a cancel proximity request to a first ProSe function entity. The first Prose function entity may propagate the cancel proximity request to a second ProSe function entity based on the stored information. The first ProSe function entity may cancel location reporting on the communication device from a corresponding SLP server. The second ProSe function entity may cancel location reporting on another communication device from a corresponding SLP server, and acknowledge the proximity request cancellation to the first ProSe function entity. Then, the first ProSe function entity may acknowledge the proximity request cancellation to the communication device.

Figure 3:
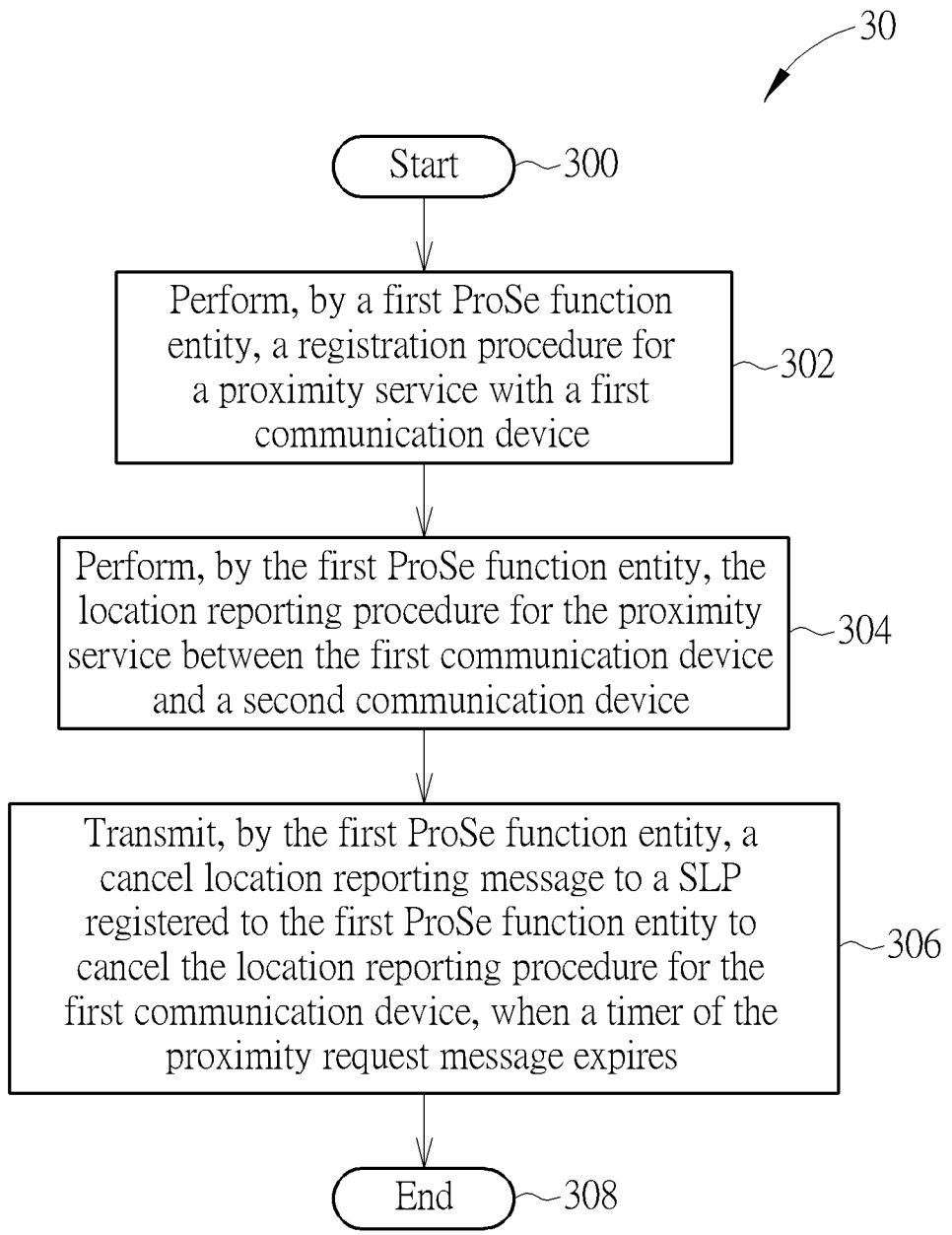
FIGS. 3-7 are flowcharts of processes according to examples of the present invention.

FIG. 3 is a flowchart of a process 30 according to an example of the present invention. The process 30 may be utilized in the network for handling a location reporting procedure. The process 30 may be compiled into the program code 214 and includes the following steps:

Step 300: Start.

Step 302: Perform, by a first ProSe function entity, a registration procedure for a proximity service with a first communication device.

Step 304: Perform, by the first ProSe function entity, the location reporting procedure for the proximity service between the first communication device and a second communication device.

Step 306: Transmit, by the first ProSe function entity, a cancel location reporting message to an associated SLP server to cancel the location reporting procedure for the first communication device registered to the first ProSe function entity, when a timer of the proximity request message expires.

Step 308: End.

According to the process 30, the first ProSe function entity performs a registration procedure for a proximity service with a first communication device, and performs the location reporting procedure for the proximity service between the first communication device and a second communication device. Then, the first ProSe function entity may transmit a cancel location reporting message to an associated SLP server to cancel the location reporting procedure for the first communication device registered to the first ProSe function entity, when a timer of the proximity request message expires. When the first communication device running a SLP client receives the message indicating the cancellation of location reporting from the SLP server, it stops the location reporting procedure. That is, the first ProSe function entity may actively cancel the location reporting procedure, to avoid unnecessary signaling overhead caused by the location reporting procedure. Thus, network resources can be saved, and flexibility and efficiency of the operation of the D2D discovery and/or communication is improved.

Realization of the present invention is not limited to the above description.

In one example, the first ProSe function entity may initiate a proximity request cancellation procedure with a second ProSe function entity by sending a proximity request cancellation message, if the first ProSe function entity does not provide information of the timer to the second ProSe function entity and the timer stored at the first ProSe function entity expires. Then, the second ProSe function entity may transmit a cancel location reporting message to an associated SLP server to cancel the location reporting procedure for the second communication device registered to the second ProSe function entity. When the second communication device running a SLP client receives the message indicating the cancellation of location reporting from the SLP server, it stops the location reporting procedure.

In one example, when a timer of the proximity request message expires, the first ProSe function entity may initiate a revocation procedure to the first communication device for an EPC assisted WLAN direct communication with the first communication device attached to an EPC network, if the EPC assisted WLAN direct communication is enabled between the first communication device and the second communication device. When the first communication device receives the message indicating the cancellation of the Wi-Fi direct communication between the first communication device and the second communication device, it stops the indicated Wi-Fi direct communication.

In one example, when receiving the proximity request cancellation message from the first ProSe function entity or the timer of the proximity request is expired, the second ProSe function entity may initiate a revocation procedure to the second communication device for an EPC assisted WLAN direct communication with the second communication device attached to an EPC network, if the EPC assisted WLAN direct communication is enabled between the first communication device and the second communication device. When the second communication device receives the message indicating the cancellation of the Wi-Fi direct communication between the first communication device and the second communication device, it stops the indicated Wi-Fi direct communication. In one example, the first ProSe function entity and the second ProSe function entity may store an enable state of the EPC assisted WLAN direct communication between the first communication device and the second communication device, when the EPC assisted WLAN direct communication is enabled between the first communication device and the second communication device. In one example, the first communication device and the second communication device may enable the EPC assisted WLAN direct communication by completing a Wi-Fi direct group setup procedure.

Figure 4:
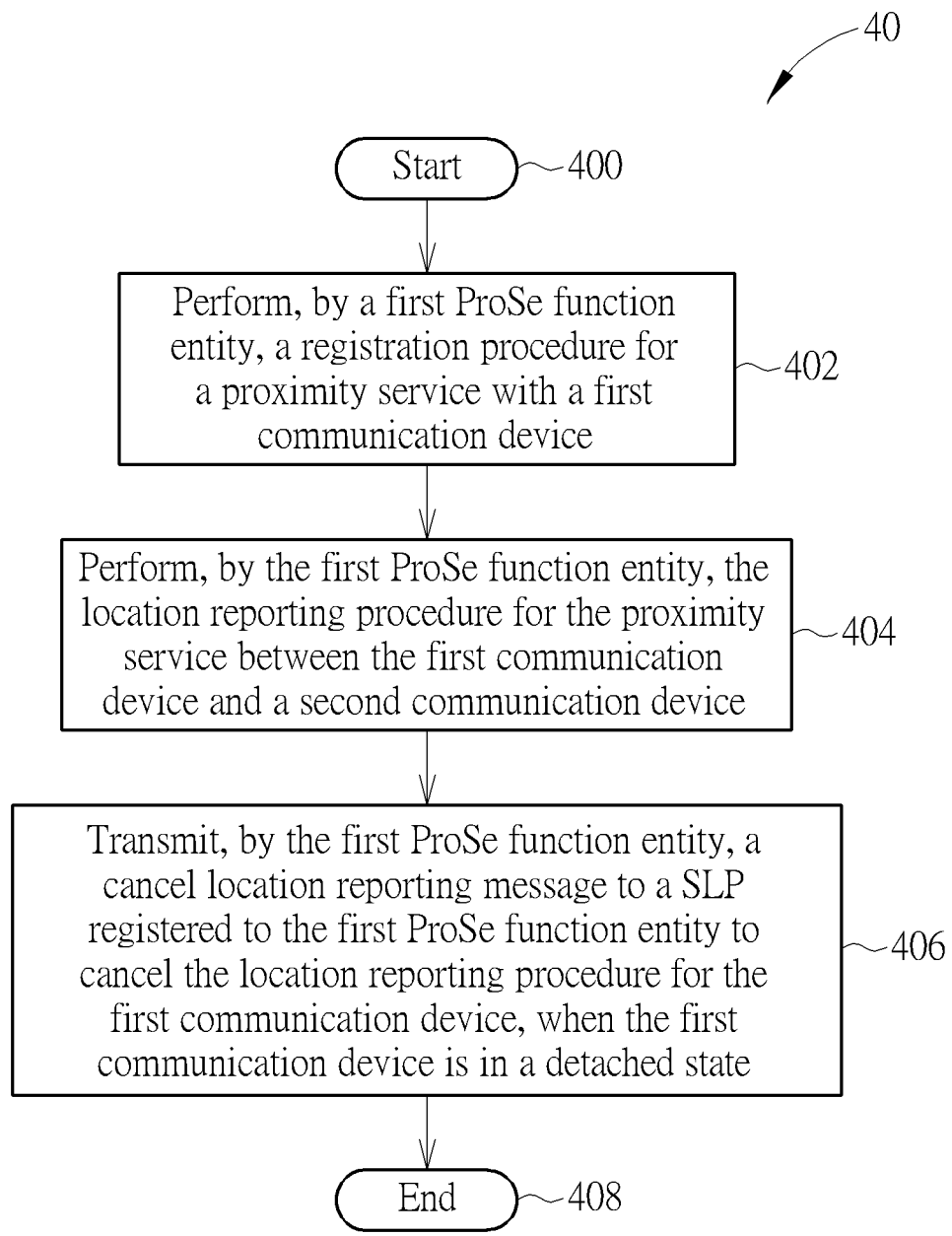

FIG. 4 is a flowchart of a process 40 according to an example of the present invention. The process 40 may be utilized in the network for handling a location reporting procedure. The process 40 may be compiled into the program code 214 and includes the following steps:

Step 400: Start.

Step 402: Perform, by a first ProSe function entity, a registration procedure for a proximity service with a first communication device.

Step 404: Perform, by the first ProSe function entity, the location reporting procedure for the proximity service between the first communication device and a second communication device.

Step 406: Transmit, by the first ProSe function entity, a cancel location reporting message with an identity of the first communication device to an associated SLP server to cancel the location reporting procedure for the first communication device registered to the first ProSe function entity, when the first communication device is in a detached state.

Step 408: End.

According to the process 40, the first ProSe function entity performs a registration procedure for a proximity service with a first communication device, and performs the location reporting procedure for the proximity service between the first communication device and a second communication device. Then, the first ProSe function entity may transmit a cancel location reporting message to an associated SLP server to cancel the location reporting procedure for the first communication device registered to the first ProSe function entity, when the first communication device is in a detached state. That is, the first ProSe function entity may actively cancel the location reporting procedure, to avoid unnecessary signaling overhead caused by the location reporting procedure. Thus, network resources can be saved, and flexibility and efficiency of the operation of the D2D discovery and/or communication is improved.

Realization of the present invention is not limited to the above description.

Figure 5:
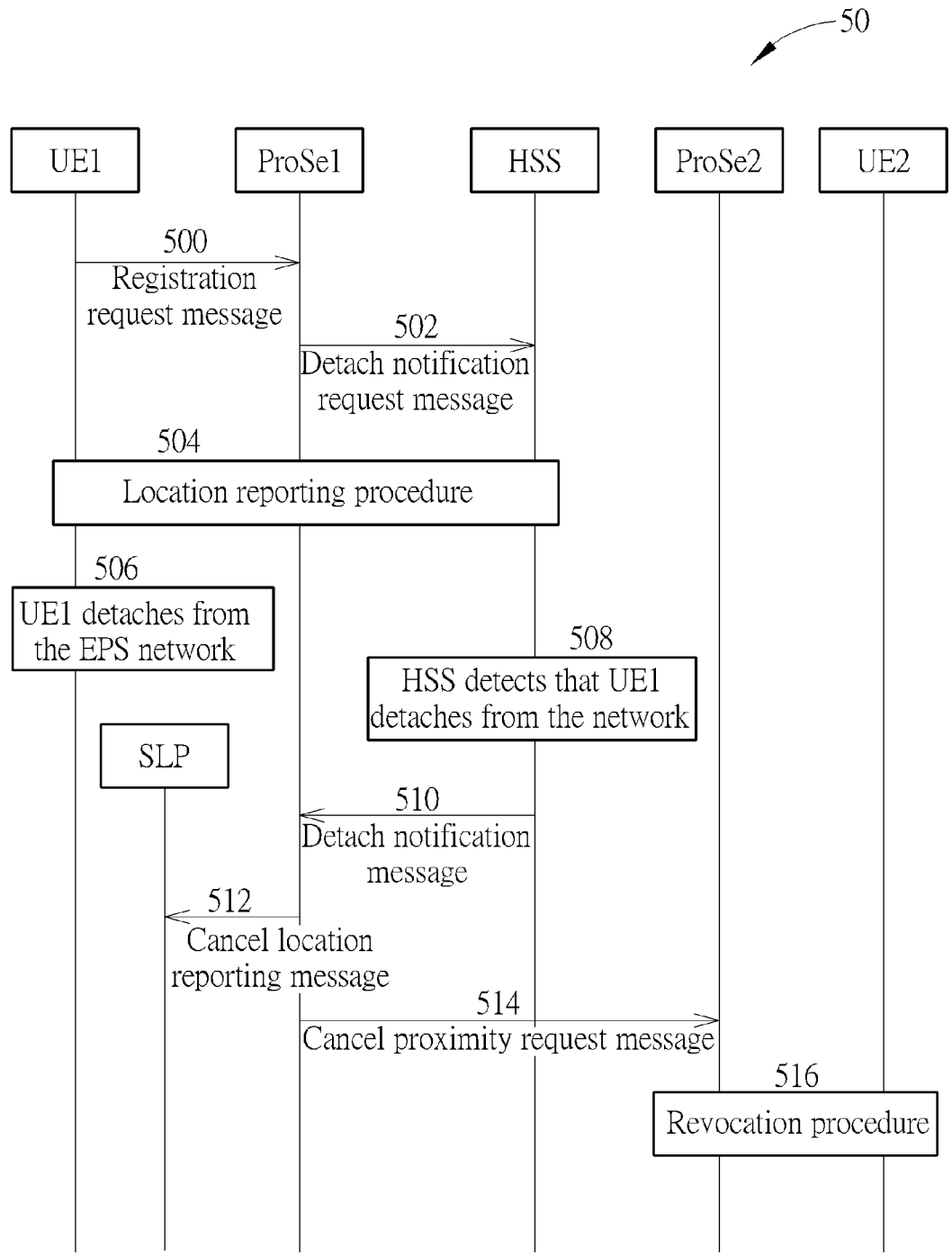

FIG. 5 is a flowchart of a process 50 according to an example of the present invention, where UEs UE1-UE2, ProSe function entities ProSe1-ProSe2, a HSS and a SLP server are shown. After the ProSe function entity ProSe1 receives a registration request message (e.g., for registration procedure) transmitted by the UE UE1 (step 500), the ProSe function entity ProSe1 transmits a detach notification request message indicating an identity of the UE UE1 to the HSS (step 502). In one example, the ProSe function entity ProSe1 may transmit the detach notification request message to the HSS, when the ProSe function entity ProSe1 receives the registration request message.

In one example, after receiving the registration request message transmitted by the UE UE1, the ProSe function entity ProSe1 may send a detach notification request message indicating an identity of the UE UE2 to the ProSe function entity ProSe2. If the ProSe function entity ProSe2 has not requested for a detach notification for the UE UE2 based on stored registration information of the UE UE2, it sends a detach notification request message indicating the identity of the UE UE2 to the HSS of the UE UE2. In one example, the Proximity function entities ProSe1 and ProSe2 may be the same network entity or different ones. In the latter case, it may be the roaming case such that the Home ProSe function entity of the UE UE1 and that of the UE UE2 are different. In the former case, it may be the non-roaming case such that the Home ProSe function entity for the UE UE1 and the UE UE2 are the same. That is, the signaling message between ProSe function entity ProSe1 and ProSe2 is not needed.

Then, for providing a proximity service, e.g., proximity discovery to discover another UE, the ProSe function entity ProSe1 may perform a location reporting procedure for the UE UE1 (step 504) and for the UE UE2. The location reporting procedure 504 may include a transmission of a proximity request message with UE1 identity from the UE UE1 to the ProSe function entity ProSe1 for reporting the location of the UE UE1 and a transmission (e.g., forwarding) of the proximity request message with UE2 identity from the ProSe function entity ProSe1 to the ProSe function entity ProSe2 for reporting the location of the UE UE2. Further, after receiving the proximity request message from the UE UE1, the ProSe function entity ProSe1 may transmit a location reporting request message with UE1 identity to the associated SLP server for reporting the location of the UE UE1, and transmit a proximity request message with UE2 identity from the ProSe function entity ProSe1 to the ProSe function entity ProSe2. Then, the ProSe function entity ProSe2 may transmit a proximity request message with UE2 identity to its SLP server for reporting the location of the UE UE2. The UE UE1 may detach from an EPS network according to a certain cause (step 506), after the above operations are performed. The HSS may detect that the UE UE1 detaches from the EPS network (step 508). In one example, the cause of the detach state of the UE UE1 may be the expiration of associated implicit detach timer on a network entity in the EPS network. In another example, the cause of the detach state of the UE UE1 may be when the detach request message is received from the UE UE1.

Then, the HSS transmits a detach notification message to the ProSe function entity ProSe1 (step 510). In one example, the HSS may store a detach notification flag set as active, the identity of the UE UE1, and an address of the ProSe function entity ProSe1, when the HSS receives the detach notification request message. In one example, the HSS may transmit the detach notification message to the ProSe function entity ProSe1 based on the stored address of the ProSe function entity ProSe1 if the detach notification flag is set as active for the UE UE1, when the HSS detects that the UE UE1 detaches from the EPS network. In one example, the ProSe function entity ProSe1 may receive information related to a detached state of the UE UE1 in the detach notification message, when a detach notification flag of the UE UE1 is set active and the UE UE1 detaches from the EPS network.

The ProSe function entity ProSe1 may transmit a cancel location reporting message to the SLP server (step 512), after receiving the detach notification message from the HSS. In addition, the ProSe function entity ProSe1 may further transmit a cancel proximity request message to the ProSe function entity ProSe2 related the UE UE2 (step 514). The cancel proximity request message may include information related to the identity of the UE UE1 in the detached state. In one example, the cancel proximity request message may include an information element indicating that the canceling proximity request is triggered by the detached state of the UE UE1. In one example, the cancel proximity request message may include an information element indicating that the UE UE1 is in the detached state. In one example, the cancel proximity request message may be transmitted to the ProSe function entity ProSe2, when the ProSe function entity ProSe1 receives the detach notification message. Note that information of an enable state of the EPC assisted WLAN direct communication may be stored in the first ProSe function entity and the second ProSe function entity, when the EPC assisted WLAN direct communication is enabled between the UE UE1 and the UE UE2.

The ProSe function entity ProSe2 may initiate a revocation procedure with the UE UE2 (step 516), after receiving the cancel proximity request message from the ProSe function entity ProSe1. In one example, the ProSe function entity ProSe2 may initiate the revocation procedure towards the UE UE2 attached to the EPC network to revoke an EPC assisted wireless local area network (WLAN) direct communication, if the EPC assisted WLAN direct communication is enabled between the UE UE1 and the UE UE2. In one example, the ProSe function entity ProSe2 may initiate the revocation procedure to the UE UE2 by sending a message indicating the cancellation of the Wi-Fi direct communication between the UE UE1 and the UE UE2. When the UE UE2 receives the message indicating the cancellation of the Wi-Fi direct communication between the UE UE1 and the UE UE2, it stops the indicated Wi-Fi direct communication. In addition, the ProSe function entity ProSe1 and the ProSe function entity ProSe2 may store an enable state of the EPC assisted WLAN direct communication between the UE UE1 and the UE UE2, when the EPC assisted WLAN direct communication is enabled between the UE UE1 and the UE UE2. The UE UE1 and the UE UE2 may enable the EPC assisted WLAN direct communication by completing a Wi-Fi direct group setup procedure.

Figure 6:
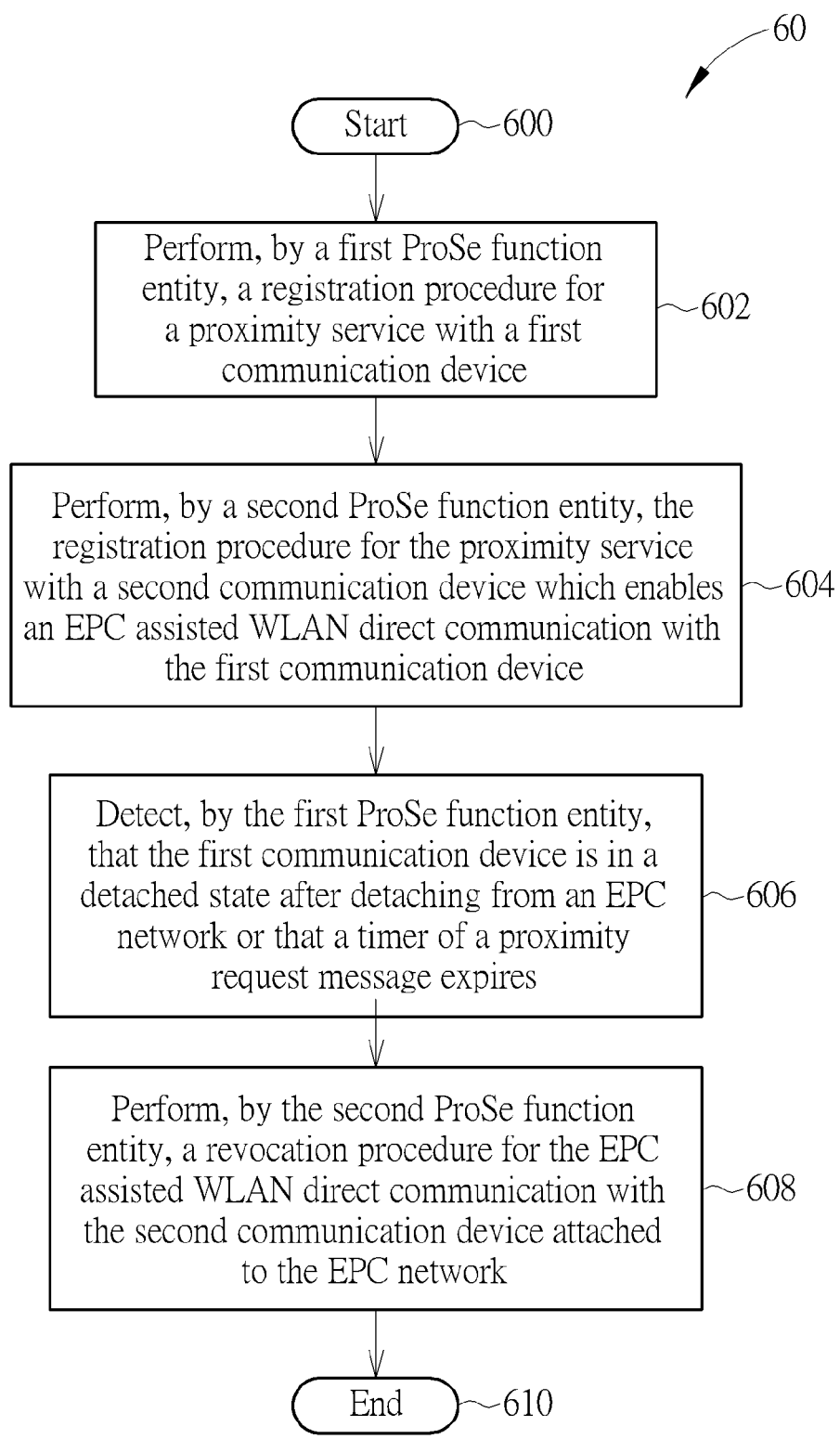

FIG. 6 is a flowchart of a process 60 according to an example of the present invention. The process 60 may be utilized in the network for handling a proximity service between two communication devices. The process 60 may be compiled into the program code 214 and includes the following steps:

Step 600: Start.

Step 602: Perform, by a first ProSe function entity, a registration procedure for a proximity service with a first communication device.

Step 604: Perform, by a second ProSe function entity, the registration procedure for the proximity service with a second communication device which enables an EPC assisted WLAN direct communication with the first communication device.

Step 606: Detect, by the first ProSe function entity, that the first communication device is in a detached state after detaching from an EPC network or that a timer of a proximity request message expires.

Step 608: Transmit, by the first ProSe function entity, a message to the second ProSe function entity.

Step 610: Perform, by the second ProSe function entity, a revocation procedure for the EPC assisted WLAN direct communication with the second communication device attached to the EPC network, if an EPC assisted WLAN direct communication is enabled between the first communication device and the second communication device.

Step 612: End.

According to the process 60, the first ProSe function entity performs a registration procedure for a proximity service with a first communication device, and the second ProSe function entity performs the registration procedure for the proximity service with a second communication device. Then, the first ProSe function entity may detect that the first communication device is in a detached state after detaching from an EPC network or that a timer of a proximity request message expires. The first ProSe function entity may transmit a message to the second ProSe function entity. Accordingly, the second ProSe function entity performs a revocation procedure for the EPC assisted WLAN direct communication with the second communication device attached to the EPC network, if an EPC assisted WLAN direct communication is enabled between the first communication device and the second communication device. When the second communication device receives the message indicating the cancellation of the Wi-Fi direct communication between the first communication device and the second communication device, it stops the indicated Wi-Fi direct communication. Note that information of an enable state of the EPC assisted WLAN direct communication may be stored in the first ProSe function entity and the second ProSe function entity, when the EPC assisted WLAN direct communication is enabled between the first communication device and the second communication device. Thus, network resources can be saved, and flexibility and efficiency of the operation of the D2D discovery and/or communication is improved.

Realization of the present invention is not limited to the above description.

Figure 7:
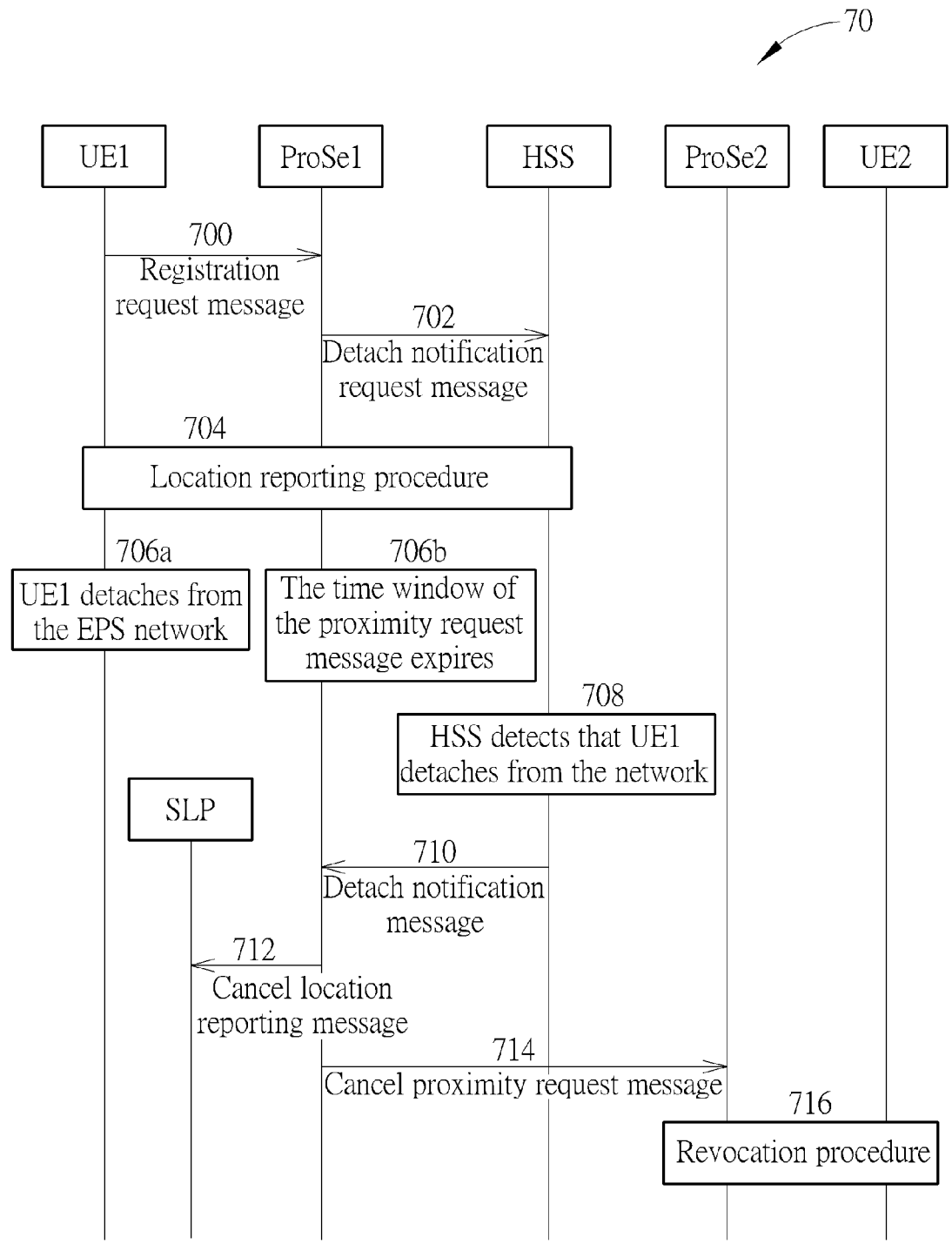

FIG. 7 is a flowchart of a process 70 according to an example of the present invention, where UEs UE1-UE2, ProSe function entities ProSe1-ProSe2, a HSS and a SLP server are shown. After the ProSe function entity ProSe1 receives a registration request message (e.g., for registration procedure) transmitted by the UE UE1 (step 700), the ProSe function entity ProSe1 transmits a detach notification request message indicating an identity of the UE UE1 to the HSS (step 702). In one example, the ProSe function entity ProSe1 may transmit the detach notification request message to the HSS, when the ProSe function entity ProSe1 receives the registration request message.

In one example, after receiving the registration request message transmitted by the UE UE1, the ProSe function entity ProSe1 may send a detach notification request message indicating an identity of the UE UE2 to the ProSe function entity ProSe2. If the ProSe function entity ProSe2 has not requested for a detach notification for the UE UE2 based on stored registration information of the UE UE2, it sends a detach notification request message indicating the identity of the UE UE2 to the HSS of the UE UE2. In one example, the Proximity function entities ProSe1 and ProSe2 may be the same network entity or different ones. In the latter case, it may be the roaming case such that the Home ProSe function entity of the UE UE1 and that of the UE UE2 are different. In the former case, it may be the non-roaming case such that the Home ProSe function entity for the UE UE1 and the UE UE2 are the same. That is, the signaling message between ProSe function entity ProSe1 and ProSe2 is not needed.

Then, for providing a proximity service, e.g., proximity discovery to discover another UE, the ProSe function entity ProSe1 may perform a location reporting procedure for the UE UE1 (step 704) and for the UE UE2. The location reporting procedure 704 may include a transmission of a proximity request message with UE1 identity from the UE UE1 to the ProSe function entity ProSe1 for reporting the location of the UE UE1 and a transmission (e.g., forwarding) of the proximity request message with UE2 identity from the ProSe function entity ProSe1 to the ProSe function entity ProSe2 for reporting the location of the UE UE2. Further, after receiving the proximity request message from the UE UE1, the ProSe function entity ProSe1 may transmit a location reporting request message with UE1 identity to the associated SLP server for reporting the location of the UE UE1, and transmit a proximity request message with UE2 identity from the ProSe function entity ProSe1 to the ProSe function entity ProSe2. Then, the ProSe function entity ProSe2 may transmit a proximity request message with UE2 identity to its SLP server for reporting the location of the UE UE2. The UE UE1 may detach from an EPS network according to a certain cause (step 706a), after the above operations are performed. In another example, a timer of a proximity request message may expire (step 706b). The HSS may detect that the UE UE1 detaches from the EPS network (step 708). In one example, the cause of the detach state of the UE UE1 may be the expiration of associated implicit detach timer on a network entity in the EPS network. In another example, the cause of the detach state of the UE UE1 may be when the detach request message is received from the UE UE1.

Then, the HSS transmits a detach notification message to the ProSe function entity ProSe1 (step 710). In one example, the HSS may store a detach notification flag set as active, the identity of the UE UE1, and an address of the ProSe function entity ProSe1, when the HSS receives the detach notification request message. In one example, the HSS may transmit the detach notification message to the ProSe function entity ProSe1 based on the stored address of the ProSe function entity ProSe1 if the detach notification flag is set as active for the UE UE1, when the HSS detects that the UE UE1 detaches from the EPS network. In one example, the ProSe function entity ProSe1 may receive information related to a detached state of the UE UE1 in the detach notification message, when a detach notification flag of the UE UE1 is set active and the UE UE1 detaches from the EPS network.

The ProSe function entity ProSe1 may transmit a cancel location reporting message to the SLP server (step 712), after receiving the detach notification message from the HSS. In addition, the ProSe function entity ProSe1 may further transmit a cancel proximity request message to the ProSe function entity ProSe2 related the UE UE2 (step 714). The cancel proximity request message may include information related to an identity of the UE UE1 in the detached state. In one example, the cancel proximity request message may include an information element indicating that the canceling proximity request is triggered by the detached state of the UE UE1. In one example, the cancel proximity request message may include an information element indicating that the UE UE1 is in the detached state. In one example, the cancel proximity request message may be transmitted to the ProSe function entity ProSe2, when the ProSe function entity ProSe1 receives the detach notification message. Note that information of an enable state of the EPC assisted WLAN direct communication may be stored in the first ProSe function entity and the second ProSe function entity, when the EPC assisted WLAN direct communication is enabled between the UE UE1 and the UE UE2.

The ProSe function entity ProSe2 may initiate a revocation procedure with the UE UE2 (step 716), after receiving the cancel proximity request message from the ProSe function entity ProSe1. In one example, the ProSe function entity ProSe1 may initiate the revocation procedure towards the UE UE1 attached to the EPC network to revoke an EPC assisted WLAN direct communication, if the EPC assisted WLAN direct communication is enabled between the UE UE1 and the UE UE2. Similarly, the ProSe function entity ProSe2 may initiate the revocation procedure toward the UE UE2 attached to the EPC network to revoke an EPC assisted WLAN direct communication. That is, the ProSe function entity ProSe2 may initiate the revocation procedure by sending a message indicating the cancellation of the Wi-Fi direct communication between the UE UE1 and the UE UE2. When the UE UE2 receives the message indicating the cancellation of the Wi-Fi direct communication between the UE UE1 and the UE UE2, it stops the indicated Wi-Fi direct communication.

In addition, the ProSe function entity ProSe1 and the ProSe function entity ProSe2 may store an enable state of the EPC assisted WLAN direct communication between the UE UE1 and the UE UE2, when the EPC assisted WLAN direct communication is enabled between the UE UE1 and the UE UE2. In one example, the first ProSe function entity may initiate a proximity request cancellation procedure with the second ProSe function entity, if the first ProSe function entity does not provide information of the timer to the second ProSe function entity and the timer expires. The UE UE1 and the UE UE2 may enable the EPC assisted WLAN direct communication by completing a Wi-Fi direct group setup procedure.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SIP), a computer on module (COM), and the wireless terminal 20.

To sum up, the present invention provides a method of handling a location reporting procedure. A ProSe function entity may actively cancel the location reporting procedure, to avoid unnecessary overhead caused by the location reporting procedure. Thus, network resources can be saved, and flexibility and efficiency of the operation of the D2D communication is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a location reporting procedure, the method comprising:
    performing, by a first proximity service (ProSe) function entity, a registration procedure for a proximity service with a first communication device; and
    performing, by the first ProSe function entity, the location reporting procedure for the proximity service between the first communication device and a second communication device; and
    transmitting, by the first ProSe function entity, a cancel location reporting message to a Secure User Plane Location (SUPL) Location Platform (SLP) server to cancel the location reporting procedure for the first communication device registered to the first ProSe function entity, when a timer of the proximity request message expires.

2. The method of claim 1, wherein the first ProSe function entity initiates a proximity request cancellation procedure with a second ProSe function entity, if the first ProSe function entity does not provide information of the timer to the second ProSe function entity and the timer expires.

3. The method of claim 1, wherein the second ProSe function entity initiates a revocation procedure to the second communication device for an evolved packet core (EPC) assisted wireless local area network (WLAN) direct communication with the second communication device attached to an EPC network, if the EPC assisted WLAN direct communication is enabled between the first communication device and the second communication device.

4. The method of claim 3, wherein the first ProSe function entity and the second ProSe function entity obtains an enable state of the EPC assisted WLAN direct communication, when the EPC assisted WLAN direct communication is enabled between the first communication device and the second communication device.

5. The method of claim 3, wherein the first communication device and the second communication device enable the EPC assisted WLAN direct communication by completing a Wi-Fi direct group setup procedure.

6. A method of handling a location reporting procedure, the method comprising:
    performing, by a first ProSe function entity, a registration procedure for a proximity service with a first communication device;

performing, by the first ProSe function entity, the location reporting procedure for the proximity service between the first communication device and a second communication device; and transmitting, by the first ProSe function entity, a cancel location reporting message with an identity of the first communication device to a Secure User Plane Location (SUPL) Location Platform (SLP) server to cancel the location reporting procedure for the first communication device registered to the first ProSe function entity, when the first communication device is in a detached state.

7. The method of claim 6, wherein the first ProSe function entity receives information related to the detached state of the first communication device in a detach notification message transmitted by a Home Subscriber Server (HSS), when a detach notification flag of the first communication device is set active and the first communication device detaches from an EPS network.

8. The method of claim 7, wherein the first ProSe function entity transmits the information related to an identity of the first communication device in the detached state in a cancel proximity request message to a second ProSe function entity.

9. The method of claim 8, wherein the cancel proximity request message is transmitted, when the first ProSe function entity receives the detach notification message.

10. The method of claim 8, wherein the HSS stores the detach notification flag set as active and an address of the first ProSe function entity, when the HSS receives a detach notification request message transmitted by the first ProSe function entity.

11. The method of claim 10, wherein the HSS transmits the detach notification message to the ProSe function entity ProSe1 based on the address of the ProSe function entity ProSe1 if the detach notification flag is set as active for the first communication device, when the HSS detects that the first communication device detaches from the EPS network.

12. The method of claim 10, wherein the first ProSe function entity transmits the detach notification request message to the HSS, when the first ProSe function entity receives a registration request message transmitted by the first communication device.

13. The method of claim 8, wherein the second ProSe function entity initiates a revocation procedure toward the second communication device attached to the EPC network to revocate an EPC assisted WLAN direct communication, if the EPC assisted WLAN direct communication is enabled between the first communication device and the second communication device.

14. The method of claim 13, wherein the first ProSe function entity and the second ProSe function entity stores an enable state of the EPC assisted WLAN direct communication between the first communication device and the second communication device, when the EPC assisted WLAN direct communication is enabled between the first communication device and the second communication device.

15. The method of claim 13, wherein the first communication device and the second communication device enable the EPC assisted WLAN direct communication by completing a Wi-Fi direct group setup procedure.

16. A method of handling a location reporting procedure, the method comprising:

performing, by a first ProSe function entity, a registration procedure for a proximity service with a first communication device;

performing, by a second ProSe function entity, the registration procedure for the proximity service with a second communication device which enables an EPC assisted WLAN direct communication with the first communication device;

detecting, by the first ProSe function entity, that the first communication device is in a detached state after detaching from an EPC network or that a timer of a proximity request message expires;

transmitting, by the first ProSe function entity, a message to the second ProSe function entity; and performing, by the second ProSe function entity, a revocation procedure for the EPC assisted WLAN direct communication with the second communication device attached to the EPC network;

wherein the first ProSe function entity receives information related to the detached state of the first communication device in a detach notification message transmitted by a HSS, when a detach notification flag of the first communication device is set active and the first communication device detaches from the EPS network.

17. The method of claim 16, wherein the first ProSe function entity transmits the information related to an identity of the first communication device in the detached state in a cancel proximity request message to the second ProSe function entity.

18. The method of claim 17, wherein the cancel proximity request message is transmitted, when the first ProSe function entity receives the detach notification message.

19. The method of claim 16, wherein the HSS stores the detach notification flag set as active and an address of the first ProSe function entity, when the HSS receives a detach notification request message transmitted by the first ProSe function entity.

20. The method of claim 19, wherein the HSS transmits the detach notification message to the ProSe function entity ProSe1 based on the address of the ProSe function entity ProSe1 if the detach notification flag is set as active for the first communication device, when the HSS detects that the first communication device detaches from the EPS network.

21. The method of claim 19, wherein the first ProSe function entity transmits the detach notification request message to the HSS, when the first ProSe function entity receives a registration request message transmitted by the first communication device.

22. The method of claim 16, wherein the first ProSe function entity initiates a proximity request cancellation procedure with the second ProSe function entity, if the first ProSe function entity does not provide information of the timer to the second ProSe function entity and the timer expires.

23. The method of claim 16, wherein information of an enable state of the EPC assisted WLAN direct communication is stored in the first ProSe function entity and the second ProSe function entity, when the EPC assisted WLAN direct communication is enabled between the first communication device and the second communication device.

* * * * *